US007100434B2

(12) United States Patent  (10) Patent No.: US 7,100,434 B2
Gu et al.                           (45) Date of Patent:     Sep. 5, 2006

(54) DEVICES AND METHODS FOR SIMULATING TIRE NON-UNIFORMITY FORCES FOR VEHICLE VIBRATION SENSITIVITY MEASUREMENTS AND TUNING

(75) Inventors: Perry Gu, Bloomfield Hills, MI (US); Michael McKee, Huntington Woods, MI (US); Ross Wiley, Clarkston, MI (US); Kevin Stone, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 10/960,191

(22) Filed: Oct. 7, 2004

(65) Prior Publication Data

US 2006/0075810 A1    Apr. 13, 2006

(51) Int. Cl.
   *E01C 23/00*    (2006.01)
(52) U.S. Cl. ........................................ 73/146
(58) Field of Classification Search ................. 73/146; 451/11; 364/570; 157/1, 1.24, 1.26
   See application file for complete search history.

(56) References Cited

U.S. PATENT DOCUMENTS

| 2,618,971 | A |  | 11/1952 | Herzegh |
|---|---|---|---|---|
| 2,920,481 | A |  | 1/1960 | Hulswit, Jr. et al. |
| 3,427,877 | A |  | 2/1969 | Swift et al. |
| 3,572,107 | A |  | 3/1971 | Hunter |
| 3,813,948 | A |  | 6/1974 | Ito |
| 3,815,425 | A |  | 6/1974 | Skidmore |
| 3,965,752 | A |  | 6/1976 | Davis |
| 4,403,507 | A |  | 9/1983 | Thomas |
| 4,458,526 | A |  | 7/1984 | Doi et al. |
| 4,635,481 | A |  | 1/1987 | Curchod |
| 5,237,505 | A |  | 8/1993 | Beebe |
| 5,317,912 | A | * | 6/1994 | Mallison ........................ 73/146 |
| 5,339,880 | A | * | 8/1994 | Kawabe et al. ................. 157/1 |
| 5,479,821 | A |  | 1/1996 | Goebel |
| 6,286,195 | B1 |  | 9/2001 | Takahashi |
| 6,347,547 | B1 |  | 2/2002 | Moriguchi et al. |
| 6,505,510 | B1 |  | 1/2003 | Goebel |
| 6,786,800 | B1 | * | 9/2004 | Delmoro et al. .............. 451/11 |
| 2003/0005757 | A1 |  | 1/2003 | Koeune et al. |
| 2003/0010105 | A1 |  | 1/2003 | Kunsch et al. |
| 2005/0081614 | A1 |  | 4/2005 | Zhu |

FOREIGN PATENT DOCUMENTS

WO    WO2005040750    5/2005

OTHER PUBLICATIONS

UK Patent Office Search Report for UK Patent Application No. GB.520050.6 dated Feb. 16, 2006.

* cited by examiner

*Primary Examiner*—Jewel V. Thompson
(74) *Attorney, Agent, or Firm*—Fredrick V. Owens

(57) ABSTRACT

The many embodiments of the present invention comprise a device to simulate first order and higher-order tire non-uniformity forces. Some embodiments may comprise a wheel adapter adapted to attach to a vehicle wheel, rotate in a first rotational direction, and to couple to a gearbox; a weight retaining member adapted to be coupled to the gearbox, wherein the gearbox is adapted to rotate the weight retaining member in a second rotational direction or at a second rotational speed in the first and second rotational directions; and a rotation restriction member adapted to attach to the gearbox and to restrict the gearbox from rotating. Other devices and methods are also claimed and described.

45 Claims, 9 Drawing Sheets

DEVICES AND METHODS FOR SIMULATING TIRE NON-UNIFORMITY FORCES FOR VEHICLE VIBRATION SENSITIVITY MEASUREMENTS AND TUNING

TECHNICAL FIELD

The present invention relates, generally, to the field of testing vehicle vibration sensitivity to tire non-uniformity forces and, more specifically, to devices and methods for simulating tire non-uniformity forces during vehicle vibration sensitivity testing.

BACKGROUND

Today, most tire manufacturers utilize computer-controlled equipment and processes to manufacture vehicle tires. The use of such equipment and processes would, seemingly, lead to the production of vehicle tires which are virtually identical or uniform. Each vehicle tire, however, may be slightly different and have slightly different properties due to variations in the specific rubber, cording, and other materials used to produce the tire.

The non-uniformity of properties, or irregularities, in vehicle tires generates certain forces (sometimes referred to herein as "tire non-uniformity forces") on a vehicle when the tires are mounted on a vehicle and the vehicle is driven under different conditions. These non-uniformity forces excite vehicle vibration. The perception of a vehicle's driver to such vibrations are affected by two major factors: the magnitudes of the non-uniformity forces and vehicle sensitivities to such non-uniformity forces. However, other factors may also effect the perception of a vehicle's driver to such forces. The tire non-uniformity forces are typically repeated with each revolution of a tire and are often periodic corresponding to primary tire rotation frequency (referred to herein as "first order") or other higher order frequencies such as two, three, or fourth order frequencies (referred to herein as "high order"). Each vehicle may have many resonant frequencies in its chassis, frame, suspension system, steering linkage, and other components and subsystems which might be easily excited by the tire non-uniformity forces at certain vehicle speeds. These resonant behaviors of the system/subsystem may also affect the sensitivity of a vehicle.

For vehicle manufacturers, it is desirable to minimize a vehicle's sensitivity and, thus, the driver's perception to the vibration caused by such tire non-uniformity forces. Typically, vehicle manufacturers have to measure a vehicle's sensitivity by first testing the vehicle with different sets of tires having different levels of tire non-uniformity forces (including, without limitation, first and higher order force levels). Then tires are selected for the vehicle which generate acceptable non-uniformity forces and which provide acceptable vibration levels as measured by accelerometers and/or other sensors mounted at the vehicle's steering wheel and seat track. Unfortunately, the selection of tires which have such attributes is a very time-consuming and costly process since a large number of tires (possibly, hundreds of tires) may have to be sorted using high-speed uniformity testing machines in order to find an acceptable set of tires. The selection process is further exacerbated when it is necessary to find tires that produce high vertical non-uniformity forces and low horizontal non-uniformity forces or that produce certain ratios of such forces.

Therefore, there exists in the industry, a need for devices and methods for simulating tire non-uniformity forces during vehicle vibration sensitivity testing and for testing vehicle sensitivities to tire non-uniformity forces, and that addresses these and other problems or difficulties which exist now or in the future.

SUMMARY

The various embodiments of the present invention provide devices and methods for simulating tire non-uniformity forces and measuring vehicle vibration sensitivities. Some embodiments may comprise a wheel adapter capable of being attached to a gearbox and vehicle wheel so that the adapter rotates in the direction of a vehicle wheel; a weight retaining member capable of being attached to the gearbox and rotated at the same speed as the tire in an opposite direction; and a rotation restriction member capable of being attached to the gearbox to restrict the gearbox from rotating. Some embodiments may also comprise at least one weight directly or indirectly coupled to a vehicle wheel adapted to rotate relative to the rotation of a vehicle wheel undergoing testing. Other embodiments may comprise a wheel adapter capable of being attached to a vehicle wheel; a housing that houses two gearboxes and two disks; and a rotation restriction member adapted to attach to the housing and to restrict the gearboxes from rotating. In some embodiments, the two disks may hold weights, rotate in the same or opposite directions, or rotate at speeds higher than a vehicle tire speed.

DETAILED DESCRIPTION

Figure 1:
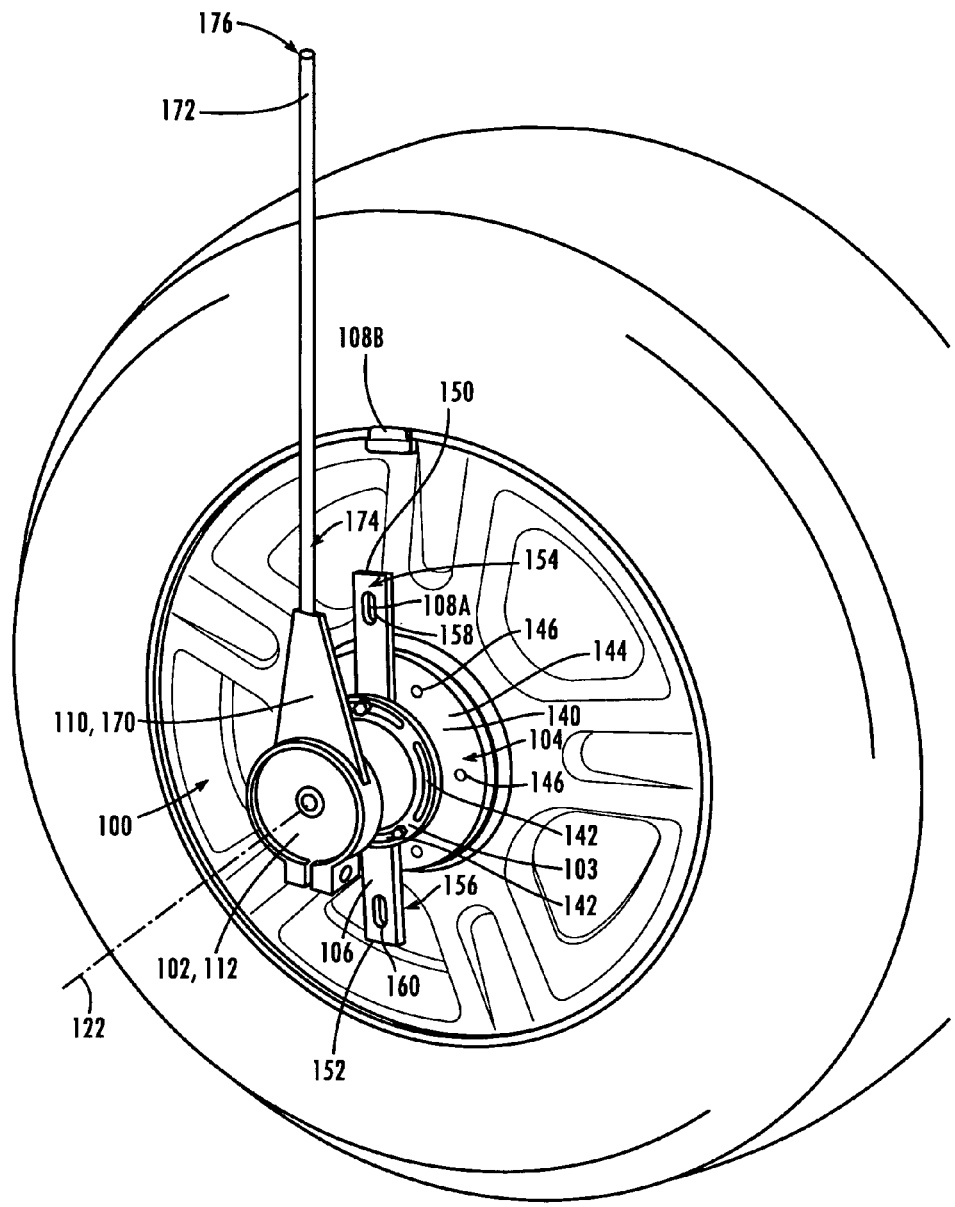
FIG. 1 displays a perspective view of a first order tire non-uniformity force simulator device, in accordance with an embodiment of the present invention, attached to a vehicle wheel.

Referring now to the drawings in which like numerals represent like elements throughout the several views, FIG. 1 displays a perspective view of a first order tire non-uniformity force simulator device 100 in accordance some embodiments of the present invention. The first order tire non-uniformity force simulator device 100 (also sometimes referred to herein as a "first order force simulator device 100") is shown in FIG. 1 secured to a wheel of a vehicle during testing of the vehicle's sensitivity to first order tire non-uniformity forces. The first order force simulator device 100 may comprise a reversing one-to-one ratio gearbox 102, a wheel adapter 104, a weight retaining member 106, a plurality of imbalance weights 108, and a rotation restriction member 110.

Figure 2:
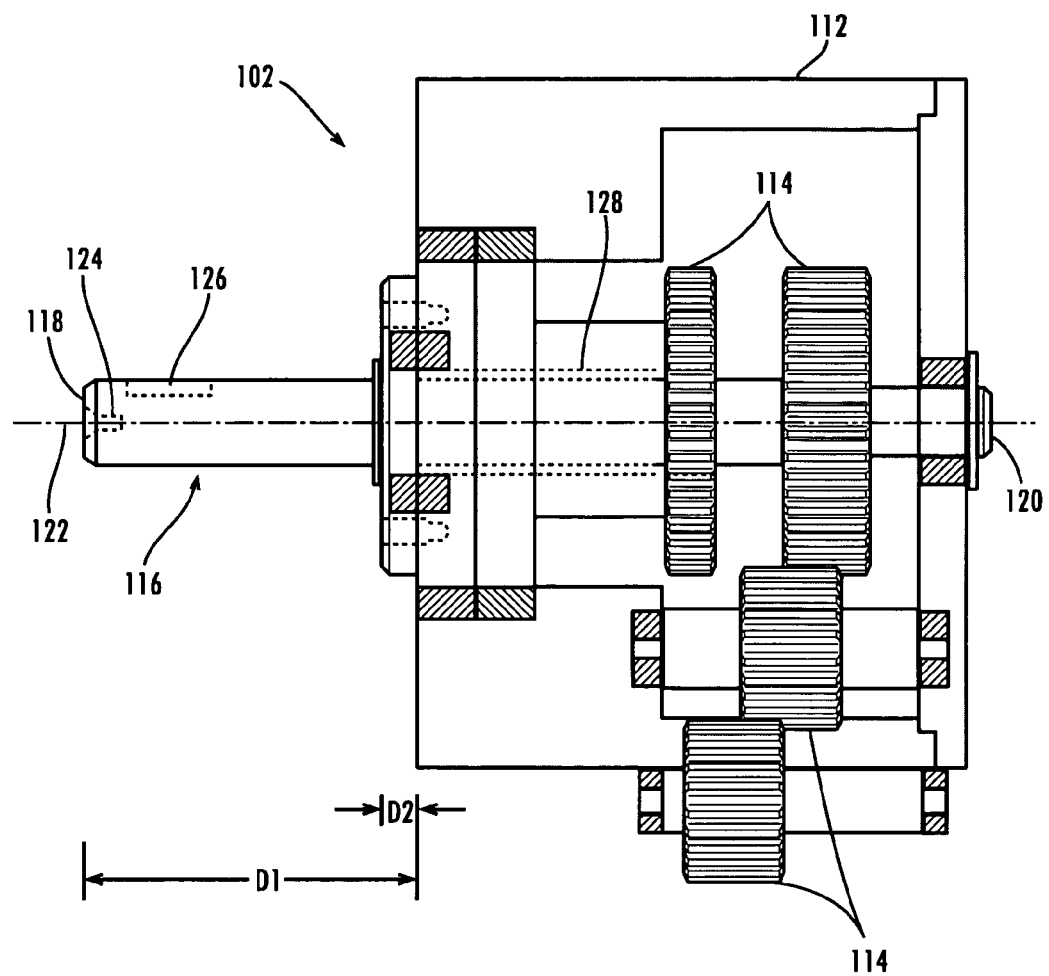
FIG. 2 displays a pictorial view of a reversing one-to-one gearbox of the first order tire non-uniformity force simulator device of FIG. 1.

The reversing gearbox 102, as illustrated in the pictorial view of FIG. 2, includes a housing 112 which encloses a plurality of gears 114 mounted for rotation therein. An input shaft 116 extends a first distance, D1, from the housing 112 of the reversing gearbox 102 and may operable to rotate in a first rotational direction at a rotational speed. During use, the first rotational direction and rotational speed correspond, respectively, to the rotational direction and rotational speed of a vehicle wheel to which the first order force simulator device 100 is attached. The input shaft 116 has a, generally, cylindrical shape with first and second ends 118, 120 and defines a longitudinal centerline axis 122 for extending through the first and second ends 118, 120. The input shaft 116 also defines a bore 124 therein extending from the first end 118 toward the second end 120 about the longitudinal centerline axis 122 for securing the wheel adapter 104 on the shaft 116 therein during use. Additionally, the input shaft 116 has a key slot 126 proximate the first end 118 thereof for attachment of the input shaft 116 and wheel adapter 104. An output shaft 128 comprises a sleeve having an annular cross-section extending a second distance, D2, from the reversing gearbox 102 in the same direction as the input shaft 116 and coaxially aligned around the input shaft 116 and the longitudinal centerline axis 122. In some embodiments, the second distance, D2, may be less than the first distance, D1, thereby enabling attachment of the wheel adapter 104 about the input shaft 116. The plurality of gears 114 are interposed between the input and output shafts 116, 128 and are selected, designed, and arranged so as to cause the reversing gearbox 102, during use, to rotate the output shaft 128 in a second rotational direction opposite the first rotational direction and at the same rotational speed as the input shaft 116.

The wheel adapter 104 as displayed in FIG. 1 may include a collar portion 140 which defines a bore (not visible) therein configured to receive a portion of the input shaft 116 of the reversing gearbox 102 and to interact with the key slot 126 to enable attachment of the collar portion 140 to the input shaft 116. When so attached, the collar portion 140 is coaxially positioned around the input shaft 116 and the longitudinal centerline axis 122 thereof. The wheel adapter 104 further includes a flange portion 144 extending from the collar portion 140 and having a plurality of holes 146 extending therethrough which are located and adapted to receive the studs extending from a vehicle wheel. During use, the wheel adapter 104 rotates with a vehicle wheel to which it is attached and relative to the reversing gearbox 102. And, by virtue of its attachment to input shaft 116, the wheel adapter 104 causes the input shaft 116 of the reversing gearbox 102 to rotate in the first rotational direction (i.e., the rotational direction of the vehicle wheel) and at the rotational speed of the vehicle wheel.

The simulator device 100 may also comprise a disk 103 adapted to couple the weight retaining member 106 to the output shaft 128. The disk 103 may be coaxially positioned around the input shaft 116 and the longitudinal centerline axis 122 thereof. The disk 103 may also comprise a plurality of slots 142 spaced around the periphery of the disk 103. The slots 142 may be adapted to allow the weight retaining member 106 to be coupled to the disk 103 so that the weight retaining member 106 rotates in the same direction as disk 103 and output shaft 128. The slots 142 may also enable the weight retaining member to be adjusted along the periphery of the disk 103 for ease and flexibility of use.

The weight retaining member 106 in some embodiments may comprise an elongated bar of minimal thickness having first and second ends 150, 152 and first and second substantially planar, opposed sides 154, 156. The weight retaining member 106 defines first and second holes 158, 160 extending between sides 154, 156 proximate respective first and second ends 150, 152 for receiving an imbalance weight 108. The first and second holes 158, 160 have substantially the same dimensions and are disposed such that the center of each hole 158, 160 is located equally distant from a midpoint location between the first and second ends 150, 152. Because the first and second holes 158, 160 have substantially the same dimensions, a substantially equal amount of mass is not present in the volumes of the holes 158, 160, thereby neutrally balancing the weight retaining member 106 about the midpoint location between the first and second ends 150, 152. Generally, during use, an imbalance weight 108 may be secured within only one of the first and second holes 158, 160, thereby creating an imbalance excitation in the distribution of mass between the first and second ends 150, 152 of the weight retaining member 106.

The weight retaining member 106 is secured to the disk 103 which is coupled to the output shaft 128 of the reversing gearbox 102. The first and second ends 150, 152 (and, hence, the centers of the first and second holes 158, 160) are, respectively, positioned equidistant from the longitudinal centerline axis 122 of the input shaft 116 of the reversing gearbox 102. The distance between the centers of each of the first and second holes 158, 160 and the longitudinal centerline axis 122 may be equal to one-half of the diameter of the vehicle wheel to which the first order force simulator device 100 is attached. It should be understood, however, that other distances may also be used in other embodiments, and that the length of the weight retaining member 106 may vary according to the many embodiments of the present invention.

During use, the weight retaining member 106 may rotate in the rotational direction of the output shaft 128 (i.e., opposite the rotational direction of the vehicle wheel to which the first order force simulator device 100 is attached), but at the same rotational speed as the vehicle wheel. By positioning a first imbalance weight 108A within one of the holes 158, 160 of the weight retaining member 106, a first mass is positioned at an eccentric location offset relative to the longitudinal centerline axis 122 of the reversing gearbox 102 and, hence, relative to the longitudinal centerline axis of the vehicle wheel (i.e., because the longitudinal centerline axis 122 of the reversing gearbox 102 and the longitudinal centerline axis of the vehicle wheel are collinear when the first order force simulator device 100 is attached to the vehicle wheel). Thus, when the weight retaining member 106 rotates in the second rotational direction which is opposite the rotational direction of the vehicle wheel (i.e., the first rotational direction), the eccentrically-located first mass also rotates in the second rotational direction. Additionally, some embodiments may also comprise at least one weight directly or indirectly coupled to a vehicle wheel adapted to rotate relative to the rotation of a vehicle wheel undergoing testing.

The plurality of imbalance weights 108, as described above, comprises a first weight 108A which resides within one of the holes 158, 160 of the weight retaining member 106. The first imbalance weight 108A is sized and shaped to fit cooperatively within one of the holes 158, 160. The first imbalance weight 108A may weigh approximately one to approximately four ounces. The plurality of imbalance weights 108 further comprises a second imbalance weight 108B which, during use of the first order force simulator device 100, is attached directly to the periphery of the vehicle wheel at an angular position about the longitudinal centerline axis 122 which is substantially identical to the angular position of the first imbalance weight 108A about the longitudinal centerline axis 122. The second imbalance weight 108B may weigh about one-half ounce to about three ounces or approximately one half of the imbalance weight 108A. The distance between the centers of the first and second holes 158, 160 and the longitudinal centerline axis 112 may be equal to one-half the diameter of the vehicle wheel to which the first order simulator device 100 is attached. By so positioning the second imbalance weight 108B during use, a second mass is positioned at an eccentric location offset relative to the longitudinal centerline axis 122 of the reversing gearbox 102 and, hence, relative to the longitudinal centerline axis of the vehicle wheel (i.e., because the longitudinal centerline axis 122 of the reversing gearbox 102 and the longitudinal centerline axis of the vehicle wheel are collinear when the first order force simulator device 100 is attached to the vehicle wheel). The first and second imbalance weights are positioned to rotate relative to the vehicle wheel. Thus, when the vehicle wheel rotates in the first rotational direction, the eccentrically-located second mass also rotates in the first rotational direction at the rotational speed of the vehicle wheel.

The rotation restriction member 110 includes a yoke 170 which extends at least partially around and in contact with the housing 112 of the reversing gearbox 102. The yoke 170 clamps about the housing 112 of the reversing gearbox 102. The rotation restriction member 110 further includes a bar 172 having first and second ends 174, 176. The bar 172 connects to the yoke 170 at its first end 174 and extends from the yoke 170 in a, generally, vertical direction when the first order force simulator device 100 is attached to a vehicle wheel. The bar 172 is secured, near its second end 176, to a vehicle fender above the vehicle wheel during use, thereby preventing the yoke 170 and the housing 112 of the reversing gearbox 102 from rotating about longitudinal centerline axis 122. In some embodiments, the bar 172 may be secured to other fixed objects capable of preventing the housing 112 from rotating such as other vehicle parts, a weight system, or other type of tether.

In use according to a method embodiment, the first order force simulator device 100 is attached to the wheel of a vehicle undergoing testing by securing the wheel adapter 104 to the vehicle wheel. As the vehicle wheel is rotated (e.g., either by the vehicle being driven on a road or by an external device imparting rotation to the vehicle wheel), the second imbalance weight 108B is rotated about the longitudinal centerline axis of the wheel at a radial location offset from the longitudinal centerline axis by a distance approximately equal to one-half the diameter of the vehicle wheel (i.e., the radius of the vehicle wheel). The second imbalance weight 108B is rotated in the same rotational direction (i.e., the first rotational direction) and at the same rotation speed as the vehicle wheel. In addition, as the vehicle wheel is rotated, the wheel adapter 104 rotates in the rotational direction of the vehicle wheel and by virtue of their connection, causes the input shaft 116 of the reversing gearbox 102 to rotate in the same direction (i.e., the first rotational direction). The wheel adapter 104 and input shaft 116 also rotate at the same rotational speed as the vehicle wheel.

The reversing gearbox 102 transfers the rotation of input shaft 116 to output shaft 128, causing output shaft 128 to rotate in the rotational direction (i.e., the second rotational direction) opposite to the rotational direction of the vehicle wheel. Since in some embodiments, the reversing gearbox 102 may have a one-to-one gear ratio, the rotational speed of the output shaft 128 may substantially equal the rotational speed of the input shaft 116. Because the weight retaining member 106 is securely attached to output shaft 128 via disk 103, the first imbalance weight 108A is rotated about the longitudinal centerline axis 122 of the reversing gearbox 102 (and, hence, about the longitudinal centerline axis of the wheel) at a radial location offset from the longitudinal centerline axis 122 by a distance approximately equal to one-quarter of the diameter of the vehicle wheel. The first imbalance weight 108A may rotate in the second rotational direction (i.e., opposite to the rotational direction of the vehicle wheel), but at substantially the same speed as the input shaft 116 and vehicle wheel.

It should be noted that to test a vehicle's sensitivity to different amplitudes of tire non-uniformity forces and/or to conduct different test runs on the same or different vehicles, the first order force simulator device 100 may be configured with imbalance weights 108 having weight measures other than those described herein or with first imbalance weight 108A and second imbalance weight 108B having the same or different weight measures relative to one another. Similarly, the first order force simulator device 100 may also be configured with a weight retaining member 106 having holes 158, 160 located at an offset distance relative to the longitudinal centerline axis 122 of the reversing gearbox 102 which is different than that described herein, thereby causing first imbalance weight 108A to be positioned at a different offset distance relative to longitudinal centerline axis 122 and, hence, more or less eccentric to longitudinal centerline axis 122. Further, the first order force simulator device 100 may be configured for different test runs with different combinations of first and second imbalance weights 108A, 108B and offset distances relative to longitudinal centerline axis 122.

The first order force simulator device 100, through rotation of imbalance weights 108A, 108B in opposite rotational directions, generates a resultant excitation force on the rotational shaft of a vehicle wheel comprising a first excitation force produced by rotation of the first imbalance weight 108A and a second excitation force produced by rotation of the second imbalance weight 108B. The first excitation force is transmitted from output shaft 128 to the rotational shaft of the vehicle wheel via the input shaft 116 and wheel adapter 104. The second excitation force is transmitted to the rotational shaft of the vehicle wheel by virtue of the second excitation force being applied directly to the vehicle wheel and the vehicle wheel being secured to the rotational shaft. The resultant excitation force is transmitted from the rotational shaft of the vehicle wheel to the vehicle's steering wheel through the vehicle's steering linkage and vehicle body through the suspension system. The resultant excitation force may be varied in amplitude and direction while testing a vehicle's sensitivity to first order tire non-uniformity forces during different test runs by using imbalance weights 108 having different weight measures (i.e., different masses), by varying the offset distance of the imbalance weights 108 (i.e., the eccentricity) from the longitudinal centerline axis 122 of the reversing gearbox 102 and longitudinal centerline axis of the vehicle wheel, and by initiating test runs with the imbalance weights 108 positioned in certain arrangements about the longitudinal centerline axis 122 of the reversing gearbox 102 and longitudinal centerline axis of the vehicle wheel. During a test run, a plurality of sensors (generally including one or more accelerometers) secured to the vehicle's steering wheel and seat track detect movements of the vehicle steering wheel and seat track which are representative of the vehicle's sensitivity to the first order tire non-uniformity force simulated by the resultant excitation force generated by the first order force simulator device 100.

The first and second excitation forces correspond to respective centrifugal forces which are generated due to the rotation of the force simulator device's imbalance weights 108 (e.g., imbalance masses). The magnitude of the centrifugal force, $F_c$, generated by rotation of a particular imbalance weight 108 is computed by:

$$F_c = mr\omega^2 \quad (1)$$

where: "m" is the mass of the imbalance weight 108; "r" is the radial distance of the imbalance weight 108 from the longitudinal centerline axis 122 or vehicle wheel longitudinal centerline axis, as the case may be; and, "ω" is the rotational speed of the imbalance weight 108 about the longitudinal centerline axis 122 or vehicle wheel longitudinal centerline axis, as the case may be equal to the vehicle wheel rotational speed.

At any given time during rotation of a particular imbalance weight 108, the generated centrifugal force has a vertical component, $F_{cv}$, and a horizontal component, $F_{ch}$. The magnitude of the vertical component, $F_{cv}$, of the generated centrifugal force is computed by:

$$F_{cv} = mr\omega^2 \sin(\theta) \quad (2)$$

where: "m", "r", and "ω" represent the same parameters as described in the previous paragraph, and "θ" is the angle between (i) the instantaneous angular position of the imbalance weight 108 about the longitudinal centerline axis 122 or vehicle wheel longitudinal centerline axis, as the case may be, and (ii) a horizontal x-axis 182 of a Cartesian coordinate system relative to which the imbalance weight 108 was aligned (as described below) prior to the start of its rotation. Similarly, the magnitude of the horizontal component, $F_{ch}$, of the generated centrifugal force is computed by:

$$F_{ch} = mr\omega^2 \cos(\theta) \quad (3)$$

where: "m", "r", and "ω" represent the same parameters as described in the previous paragraph, and "θ" represents the same angle as described for the vertical component, $F_{cv}$, of the generated centrifugal force.

Because each of the first and second excitation forces corresponds to a centrifugal force which is generated by the rotation of a particular imbalance weight 108, each such excitation force includes vertical and horizontal components equal to their corresponding centrifugal force counterparts. By summing the vertical components for the first excitation force generated by the first imbalance weight 108A and the second excitation force generated by the second imbalance weight 108B, the vertical component of the resultant excitation force, $F_{ev}$, generated by the first order force simulator device 100 at any given time is:

$$F_{ev} = m_1 r_1 \omega_1^2 \sin(\theta_1) + m_2 r_2 \omega_2^2 \sin(\theta_2) \quad (4)$$

where: "m", "r", "ω", and "θ" represent the same parameters as described above, but with respect to the first and second imbalance weights 108 as designated by the "1" and "2" subscripts. By summing the horizontal components for the first excitation force generated by the first imbalance weight 108A and the second excitation force generated by the second imbalance weight 108B, the horizontal component of the resultant excitation force, $F_{eh}$, generated by the first order force simulator device 100 at any given time is similarly given by:

$$F_{eh} = m_1 r_1 \omega_1^2 \cos(\theta_1) + m_2 r_2 \omega_2^2 \cos(\theta_2) \quad (5)$$

where: "m", "r", "ω", and "θ" represent the same parameters as described above, but with respect to the first and second imbalance weights 108 as designated by the "1" and "2" subscripts.

Figure 3:
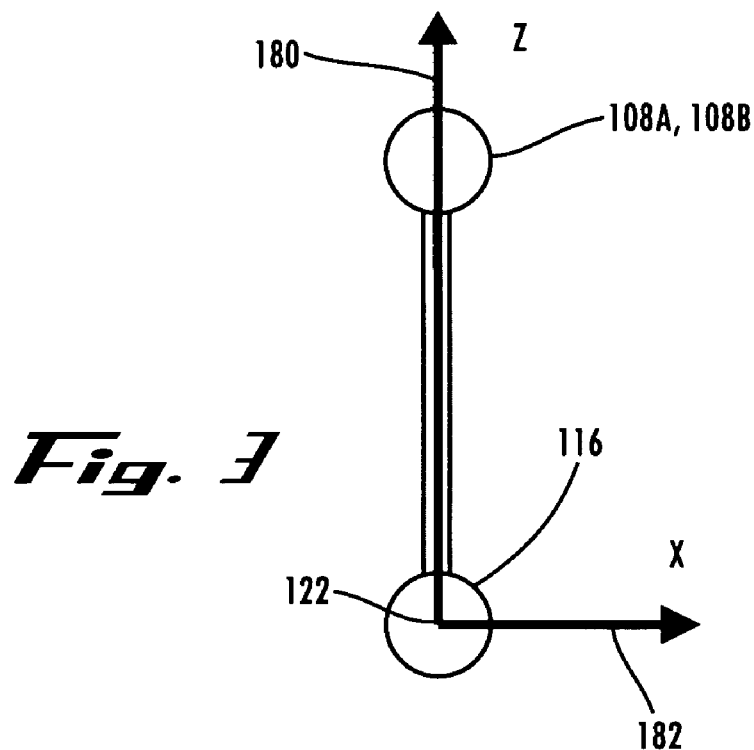
FIG. 3 displays a schematic view of an initial arrangement of the imbalance weights in accordance with some embodiments of the present invention prior to a test run to determine a vehicle's vibration sensitivity to first order or higher order tire non-uniformity forces acting only in a vertical direction.
Figure 4:
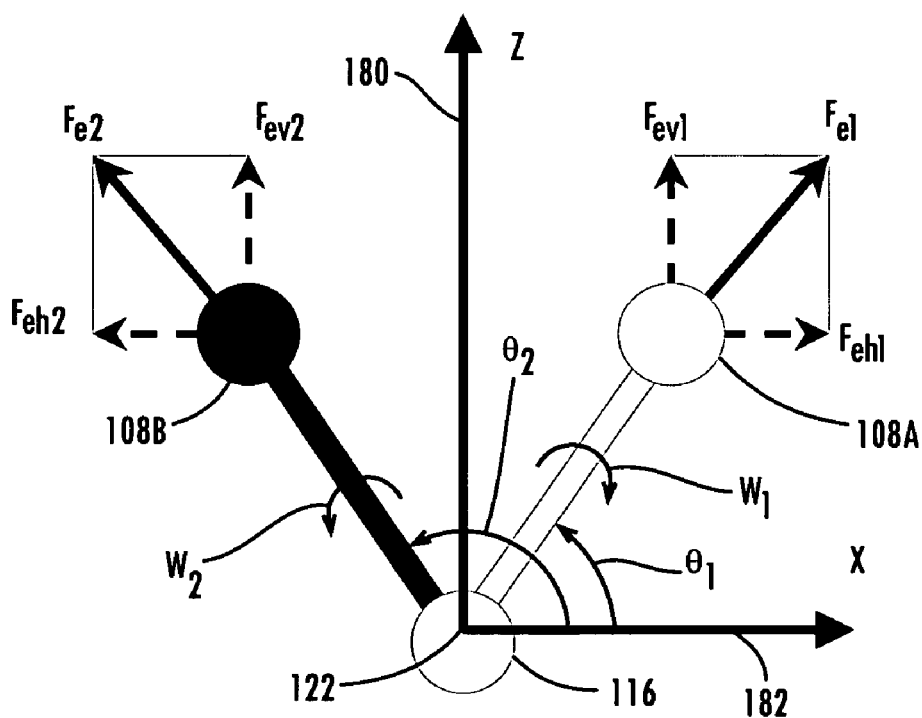
FIG. 4 displays a schematic view of the imbalance weights in accordance with some embodiments of the present invention an intermediate time during a test run to determine a vehicle's vibration sensitivity to first order or higher order tire non-uniformity forces acting only in a vertical direction.

Since the two imbalance weights 108A, 108B rotate in opposite directions during operation of the first order force simulator device 100, the direction of the resultant excitation force, $F_e$, produced by the first and second excitation forces is established, or set, for a particular vehicle sensitivity test run by arranging the positions of the imbalance weights 108 in a particular arrangement prior to the beginning of the test run. Thus, for a particular test run, if it is desired to test a vehicle's sensitivity to first order tire non-uniformity forces acting only in a vertical direction, the imbalance weights 108 are arranged prior to the start of the test run in the initial arrangement, or positions, shown schematically in FIG. 3 with both imbalance weights 108 being located along a vertical z-axis 180 passing through the longitudinal centerline axis 122 of the device's input shaft 116 and longitudinal centerline axis of the vehicle wheel. Then, with the two imbalance weights 108A, 108B rotating in opposite directions during the test run as illustrated schematically in FIG. 4 at an intermediate time between the start and end of the test run, and with the $m_1 r_1$ and $m_2 r_2$ are selected such that $$m_1 r_1 = m_2 r_2 \quad (6)$$

The horizontal components for the first excitation force generated by the first imbalance weight 108A and the second excitation force generated by the second imbalance weight 108B either (i) equal zero (e.g., when both imbalance weights 108 are aligned along vertical z-axis 170) or (ii) have the same magnitude, but act in opposite horizontal directions, thereby canceling each other such that their sum equals zero. This can be demonstrated through equation (5) for horizontal force:

Since $m_1 r_1 = m_2 r_2$ as arranged, and $\omega_1^2 = \omega_2^2$ as using one-to-one reverse gearbox 102, as well as $\theta_2 = 180 - \theta_1$, the equation (5) becomes:

$$\begin{aligned} F_{eh} &= m_1 r_1 \omega_1^2 \cos(\theta_1) + m_2 r_2 \omega_2^2 \cos(\theta_2) \quad (7)\\ &= m_1 r_1 \omega_1^2 \cos(\theta_1) + m_2 r_2 \omega_2^2 \cos(180 - \theta_1) \\ &= m_1 r_1 \omega_1^2 \cos(\theta_1) - m_2 r_2 \omega_2^2 \cos(\theta_1) \\ &= 0 \end{aligned}$$

As a consequence, the resultant excitation force, $F_e$, produced by the first order force simulator device 100 at such intermediate time acts in a positive or negative vertical direction (e.g., depending on the particular angular position of the imbalance weights 108 at such time—whether both are above or below a horizontal x-axis 172 passing through the longitudinal centerline axis 122 of the device's input shaft 116 and longitudinal centerline axis of the vehicle wheel) and is equal to the sum of the vertical components for the first excitation force generated by the first imbalance weight 108A and the second excitation force generated by the second imbalance weight 108B at such time as described above. This can be demonstrated through equation (4) for vertical force;

Since $m_1 r_1 = m_2 r_2$ as arranged, and $\omega_1^2 = \omega_2^2$ as using one-to-one reverse gearbox 102, as well as $\theta_2 = 180 - \theta_1$, the equation (4) becomes:

$$\begin{aligned} F_{ev} &= m_1 r_1 \omega_1^2 \sin(\theta_1) + m_2 r_2 \omega_2^2 \sin(\theta_2) \quad (8)\\ &= m_1 r_1 \omega_1^2 \sin(\theta_1) + m_2 r_2 \omega_2^2 \sin(180 - \theta_1) \\ &= m_1 r_1 \omega_1^2 \sin(\theta_1) + m_2 r_2 \omega_2^2 \sin(\theta_1) \\ &= 2 m_1 r_1 \omega_1^2 \sin(\theta_1) \end{aligned}$$

Figure 5:
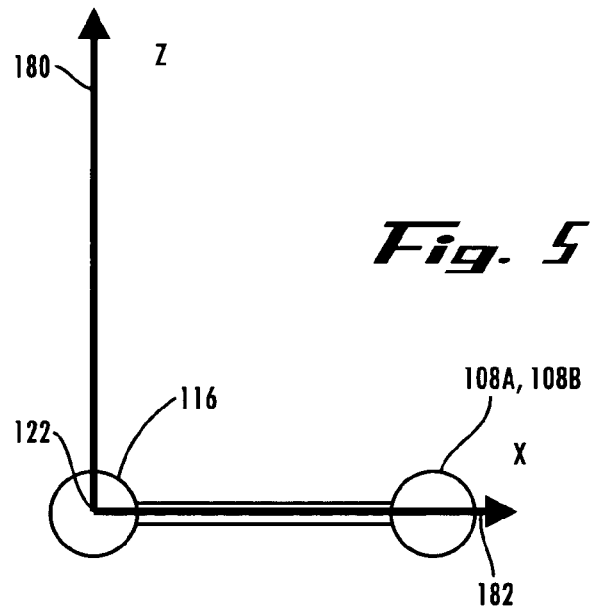
FIG. 5 displays a schematic view of an initial arrangement of the imbalance weights in accordance with some embodiments of the present invention prior to a test run to determine a vehicle's vibration sensitivity to first order or higher order tire non-uniformity forces acting only in a horizontal (vehicle fore/aft) direction.
Figure 6:
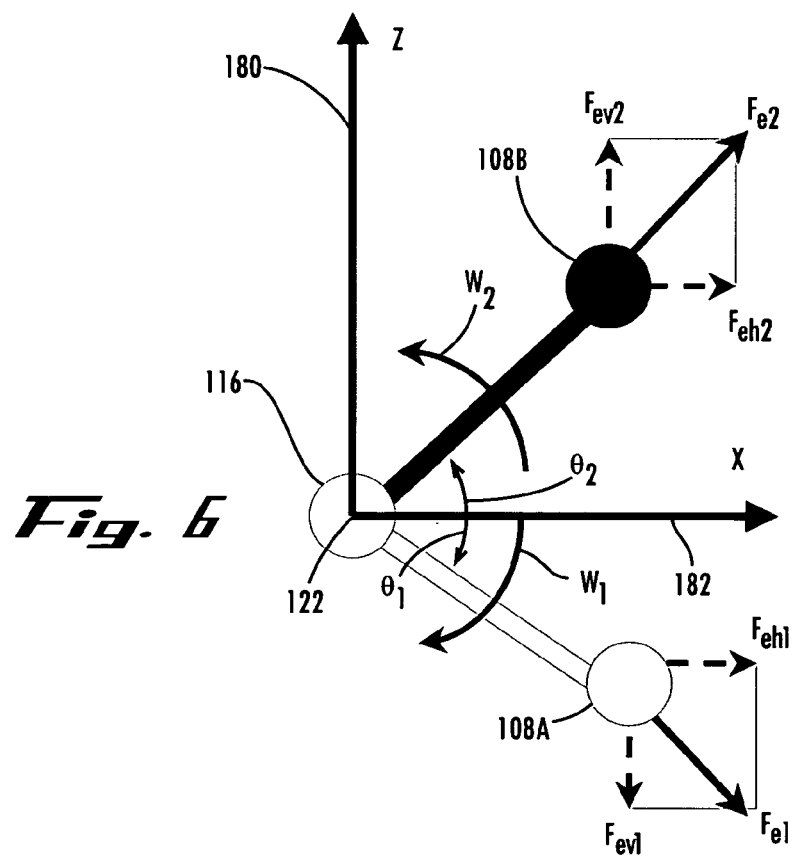
FIG. 6 displays a schematic view of the imbalance weights in accordance with some embodiments of the present invention at an intermediate time during a test run to determine a vehicle's vibration sensitivity to first order or higher order tire non-uniformity forces acting only in a horizontal (vehicle fore/aft) direction.

If, for a different test run, it is desired to test a vehicle's sensitivity to tire non-uniformity forces acting in a horizontal (i.e., vehicle fore/aft) direction, the imbalance weights 108 are oriented prior to the start of the test run in the initial arrangement, or positions, shown schematically in FIG. 5 with both imbalance weights 108 being located along the horizontal x-axis 182. Then, with the two imbalance weights 108 A, 108B rotating in opposite directions during the test run as illustrated schematically in FIG. 6 at an intermediate time between the start and end of the test run, the vertical components for the first excitation force generated by the first imbalance weight 108A and the second excitation force generated by the second imbalance weight 108B either (i) equal zero (e.g., when both imbalance weights 108 are aligned along horizontal x-axis 182) or (ii) have the same magnitude, but act in opposite vertical directions, thereby canceling each other such that their sum equals zero. This can be demonstrated through equation (4) for vertical force:

Since $m_1 r_1 = m_2 r_2$ as arranged, and $\omega_1^2 = \omega_2^2$ as using one-to-one reverse gearbox 102, as well as $\theta_2 = -\theta_1$, the equation (4) becomes:

$$\begin{aligned} F_{ev} &= m_1 r_1 \omega_1^2 \sin(\theta_1) + m_2 r_2 \omega_2^2 \sin(\theta_2) \quad (9)\\ &= m_1 r_1 \omega_1^2 \sin(\theta_1) + m_2 r_2 \omega_2^2 \sin(-\theta_1) \\ &= m_1 r_1 \omega_1^2 \sin(\theta_1) + m_2 r_2 \omega_2^2 \sin(\theta_1) \\ &= 0 \end{aligned}$$

As a consequence, the resultant excitation force, $F_e$, produced by the first order force simulator device 100 at such intermediate time acts in a positive or negative horizontal direction (e.g., depending on the particular angular position of the imbalance weights 108 at such time—whether both are left or right of the vertical z-axis 180 ) and is equal to the sum of the horizontal components for the first excitation force generated by the first imbalance weight 108A and the second excitation force generated by the second imbalance weight 108B at such time as described above. This can be demonstrated through equation (5) for horizontal force:

Since $m_1 r_1 = m_2 r_2$ as arranged, and $\omega_1^2 = \omega_2^2$ as using one-to-one reverse gearbox 102, as well as $\theta_2 = -\theta_1$, the equation (5) becomes:

$$\begin{aligned} F_{eh} &= m_1 r_1 \omega_1^2 \cos(\theta_1) + m_2 r_2 \omega_2^2 \cos(\theta_2) \quad (10)\\ &= m_1 r_1 \omega_1^2 \cos(\theta_1) + m_2 r_2 \omega_2^2 \cos(-\theta_1) \\ &= m_1 r_1 \omega_1^2 \cos(\theta_1) + m_2 r_2 \omega_2^2 \cos(\theta_1) \\ &= 2 m_1 r_1 \omega_1^2 \cos(\theta_1) \end{aligned}$$

Figure 7:
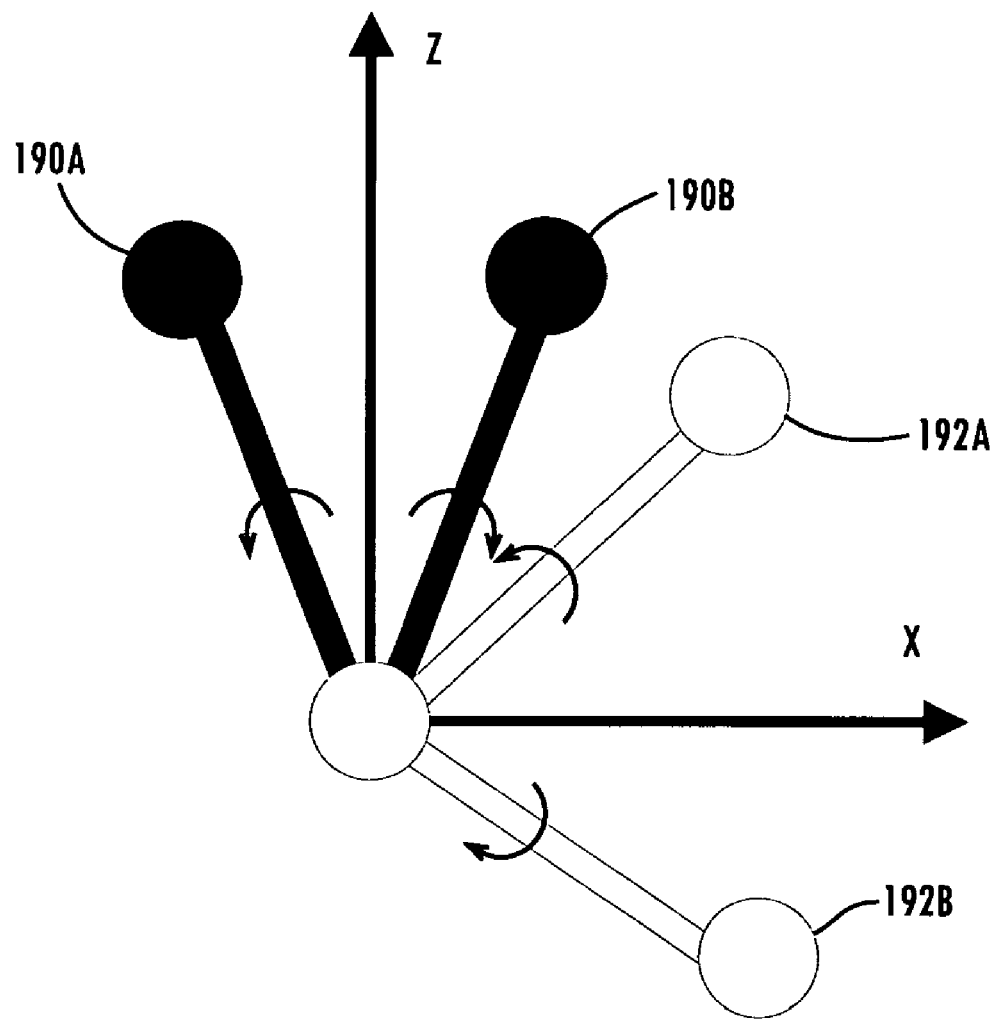
FIG. 7 displays a schematic view of an initial arrangement of pairs of imbalance weights in accordance with some embodiments of the present invention attached to a tire non-uniformity force simulator device prior to a test run to simultaneously simulate a vertical excitation force and a horizontal excitation force with a phase delay relative to the vertical excitation force.

It should be noted that the first order force simulator device 100 is further operable, with slight modification, to simulate any combination of both vertical and horizontal first order tire non-uniformity forces simultaneously having a specified phase relationship therebetween. As illustrated schematically in FIG. 7, the first order force simulator device 100 may be equipped with pairs of imbalance weights 190, 192 (or imbalance masses) such that the first pair of imbalance weights 190A, 190B simulates a vertical excitation force and the second pair of imbalance weights 192A, 192B simulates a horizontal excitation force with a phase delay relative to the vertical excitation force. The phase delay may be adjusted to a specified value by positioning the pairs of imbalance weights 190, 192 at appropriate positions relative to one another prior to the start of a test run. Since the phase delay is adjustable, the phase delay may be adjusted between test runs based on the respective vehicle response phases to vertical and horizontal excitation forces, thereby enabling the worst vehicle response to be assessed.

Because the first order force simulator device 100 is capable of producing excitation forces that simulate first order tire non-uniformity forces having specific amplitudes and directions as desired by engineers, the first order force simulator device 100 may also be used to assess a vehicle's sensitivity to a particular first order tire non-uniformity force acting in a particular direction. A vehicle's sensitivity may be defined in terms of the vehicle's nibble sensitivity (steering wheel rotation vibration) and shake sensitivity (steering wheel translation vibration) to both vertical and horizontal tire non-uniformity forces. The vehicle's nibble sensitivity to a vertical tire non-uniformity force (i.e., simulated by a vertical excitation force produced by the first order force simulator device 100 ) is defined as:

$$S_{nibble,v} = a_{nibble}/F_v \qquad (11)$$

and the vehicle's nibble sensitivity to a horizontal tire non-uniformity force (i.e., simulated by a horizontal excitation force produced by the first order force simulator device 100) is defined as:

$$S_{nibble,h} = a_{nibble}/F_h. \qquad (12)$$

Here the $a_{nibble}$ may be the measured vehicle nibble response by accelerometers positioned about the vehicle's steering wheel during the test runs, and $F_v, F_h$ are the vertical force and horizontal force generated by the first force simulator device 100, respectively. Similarly, the vehicle's shake sensitivity to a vertical tire non-uniformity force (i.e., simulated by a vertical excitation force produced by the first order force simulator device 100) is defined as:

$$S_{shake,v} = a_{shake}/F_v \qquad (13)$$

and the vehicle's shake sensitivity to a horizontal tire non-uniformity force (i.e., simulated by a horizontal excitation force produced by the first order force simulator device 100) is defined as:

$$S_{shake,h} = a_{shake}/F_h. \qquad (14)$$

Figure 8:
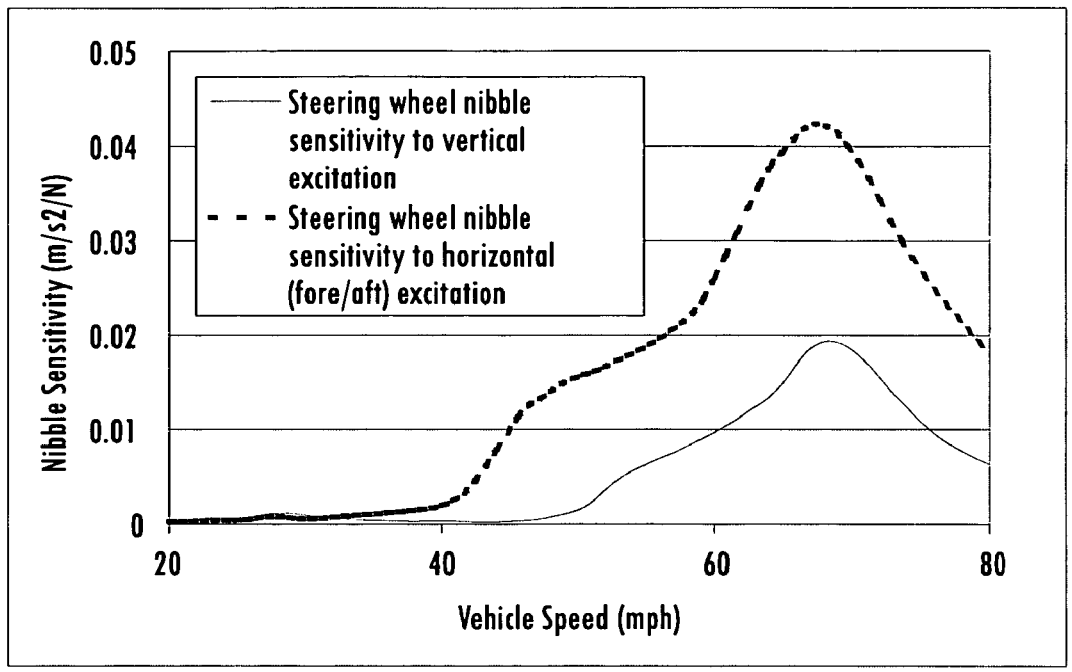
FIG. 8 displays an example of a graphical relationship between vehicle steering wheel nibble (steering rotational vibration) response sensitivity to vertical and horizontal first order tire non-uniformity forces simulated by the first order tire non-uniformity force simulator device of FIG. 1 during different test runs at different vehicle speeds.

With a vehicle's sensitivity to vertical and horizontal (fore/aft) first order tire non-uniformity forces being known, a vehicle manufacturer may set a vehicle level response target and cascade the vehicle level response target to vehicle sensitivity targets and first order tire non-uniformity force targets. FIG. 8 displays an example of graphical relationships of vehicle steering wheel nibble response sensitivity to vertical and horizontal first order tire non-uniformity forces simulated by the first order force simulator device 100 during different test runs at different vehicle speeds. In FIG. 8, the nibble response sensitivity is associated with the vertical axis and is displayed in units of meters/square second/Newton. The vehicle's speed is associated with the horizontal axis and is displayed in units of miles per hour. The solid line represents the vehicle's steering wheel nibble sensitivity to vertical first order tire non-uniformity forces (i.e., to vertical first order excitation forces generated by the first order force simulator device 100) as measured by accelerometers positioned about the vehicle's steering wheel during the test runs. The dashed line represents the vehicle's steering wheel nibble sensitivity to horizontal (fore/aft) first order tire non-uniformity forces (i.e., to horizontal (fore/aft) first order excitation forces produced by the first order force simulator device 100) as also measured by such accelerometers.

Figure 9:
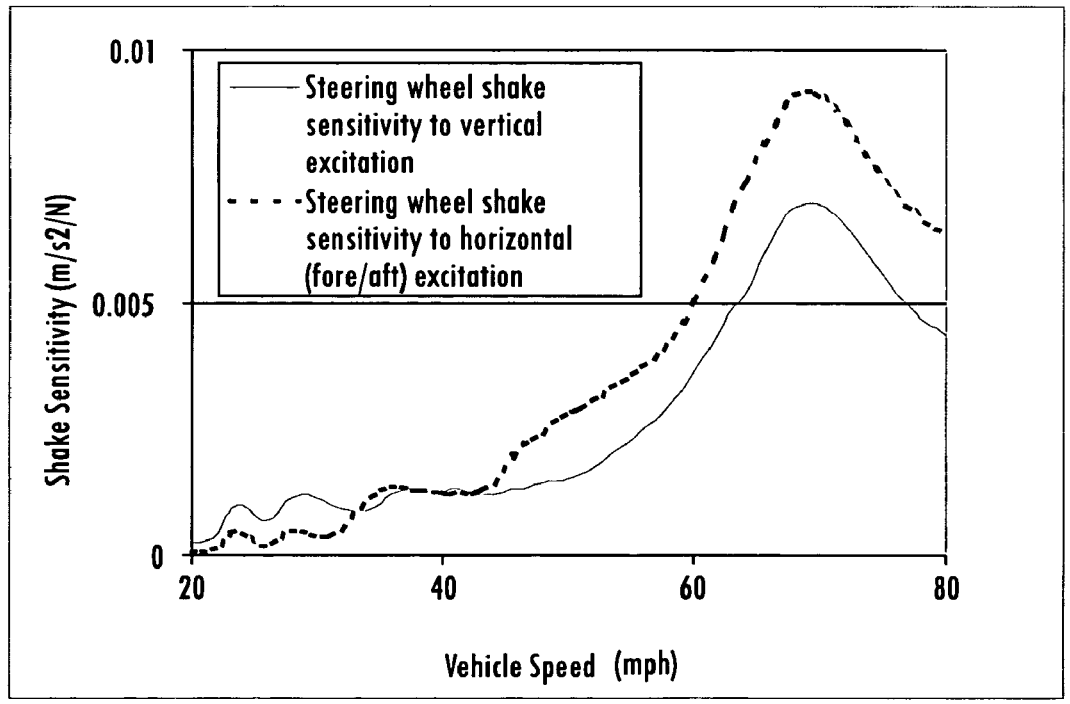
FIG. 9 displays an example of graphical relationships of vehicle steering wheel shake (lateral translation vibration) response sensitivity to vertical and horizontal first order tire non-uniformity forces simulated by the first order tire non-uniformity force simulator device of FIG. 1 during different test runs at different vehicle speeds.

Similarly, FIG. 9 displays an example of graphical relationships of vehicle steering wheel shake response sensitivity to vertical and horizontal first order tire non-uniformity forces simulated by the first order force simulator device 100 during different test runs at different vehicle speeds. In FIG. 9, the shake response sensitivity is associated with the vertical axis and is displayed in units of meters/square second/Newton, while the vehicle's speed is associated with the horizontal axis and is displayed in units of miles per hour. The solid line represents the vehicle's steering wheel shake sensitivity to vertical first order tire non-uniformity forces (i.e., to vertical first order excitation forces generated by the first order force simulator device 100) as measured by accelerometers positioned about the vehicle's steering wheel during the test runs. The dashed line represents the vehicle's steering wheel shake sensitivity to horizontal (fore/aft) first order tire non-uniformity forces (i.e., to horizontal (fore/aft) first order excitation forces produced by the first order force simulator device 100) as also measured by such accelerometers.

Figure 10:
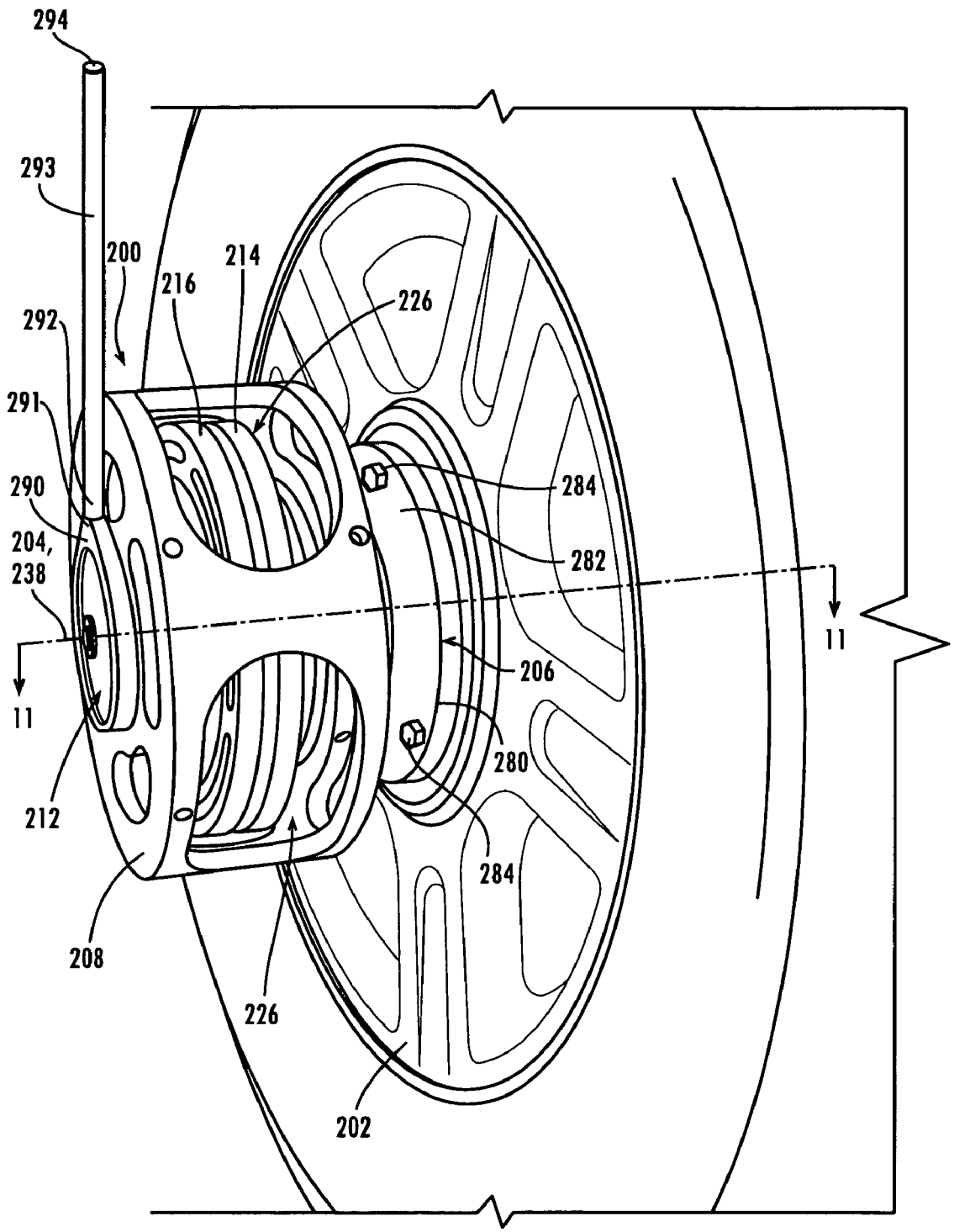
FIG. 10 displays a perspective view of a high-order tire non-uniformity force simulator device, in accordance with another embodiment of the present invention, attached to a vehicle wheel.

FIG. 10 displays a perspective view of a high-order tire non-uniformity force simulator device 200 in accordance with another embodiment of the present invention. The high-order tire non-uniformity force simulator device 200 (also sometimes referred to herein as a "high-order force simulator device 200") is configurable prior to a particular test run to simulate first, second, third and fourth order tire non-uniformity forces during such test run. Different gear set arrangements may be used to configure the simulator device 200 for different higher order forces. As illustrated in FIG. 10, the high-order force simulator device 200 is secured to a wheel 202 of a vehicle during testing of the vehicle's sensitivity to high-order tire non-uniformity forces. The wheel 202 has a longitudinal centerline axis 204 (e.g., axis of rotation) extending therethrough about which the wheel 202 rotates during vehicle testing or vehicle use.

The high-order force simulator device 200 may comprise a wheel adapter 206 and a housing 208 which partially encloses first and second gearboxes 210, 212 and first and second disks 214, 216. As discussed below in greater detail, the high-order force simulator 200 may also comprise a rotation restriction member 290 adapted to prevent the housing 208 and the first and second gearboxes 210, 212 from rotating. The housing 208 may also connect the housings of the first and second gearboxes, 210, 212 to prevent relative motion between the first and second gearboxes, 210, 212. Each disk 214, 216 defines a respective plurality of radially-located weight retaining slots 218, 220 which are adapted to receive and hold imbalance weights 222, 224 (also sometimes referred to as "imbalance masses") therein during use. The housing 208 defines a plurality of access openings 226 therethrough to allow the convenient attachment and removal of imbalance weights 222, 224 to and from the disks 214, 216 prior to or after test runs.

Figure 11:
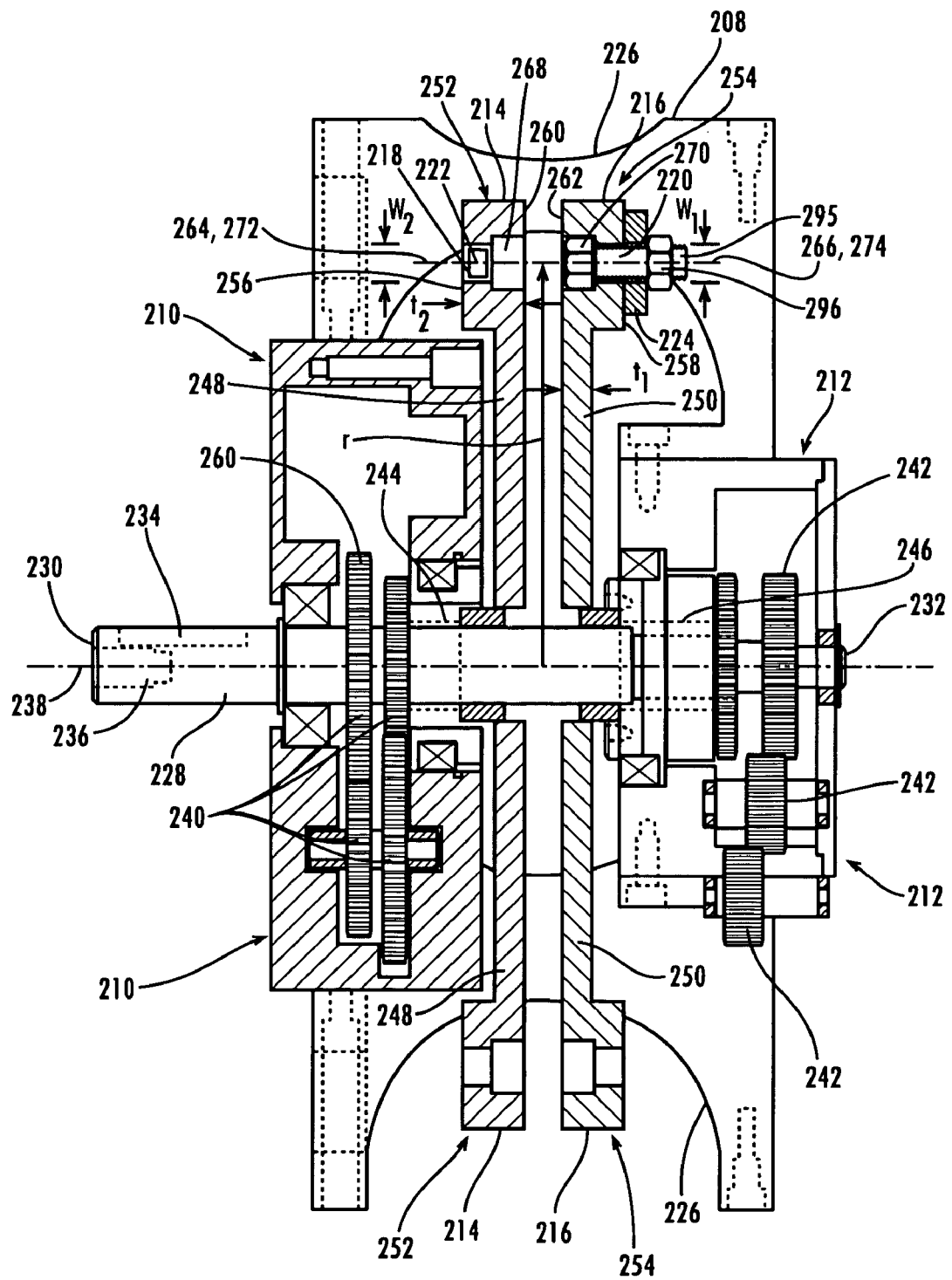
FIG. 11 displays a pictorial sectional view of the housing, gearboxes, and disks of the high-order tire non-uniformity force simulator device of FIG. 10 taken along lines 11—11.

As is more visible in the pictorial sectional view of FIG. 11 (taken along lines 11—11 of FIG. 10), the high-order force simulator device 200 further comprises an input shaft 228 having first and second opposed ends 230, 232 and defining a key slot 234 thereon proximate first end 230. A first portion of the input shaft 228, including the first end 230 and key slot 234, extends from the housing 208 and is connected to the wheel adapter 206 through interaction with key slot 234. The input shaft 228 further defines a bore 236 extending therein at first end 230 for securing the wheel adapter 206 to the input shaft 228 therein when the high-order force simulator device 200 is attached to a vehicle wheel. The input shaft 228 still further defines a longitudinal centerline axis 238 extending between first and second ends 230, 232 which comprises a longitudinal centerline axis of the housing 208, first and second gearboxes 210, 212, and first and second disks 214, 216. When the high-order force simulator device 200 is attached to a vehicle wheel 202, longitudinal centerline axis 238 and longitudinal centerline axis 204 are substantially collinear.

A second portion of the input shaft 228 extends within the housing 208 of the high-order force simulator device 200 and is adapted to rotatively interact with the first gearbox 210 in order to transfer rotary movement of the input shaft 228 about longitudinal centerline axis 238, at a first rotational speed and in a first rotational direction, to the first gearbox 210. The second portion of the input shaft 228 is also adapted to rotatively interact with the second gearbox 212 to similarly transfer rotary movement of the input shaft 228 about longitudinal centerline axis 238, at a first rotational speed and in a first rotational direction, to the second gearbox 212.

Each of the first and second gearboxes 210, 212 include respective pluralities of gears 240, 242 and respective output shafts 244, 246 that are connected, respectively, to the first and second disks 214, 216. The gears 240 of the first gearbox 210 are adapted to produce rotary movement of output shaft 244 and first disk 214 about longitudinal centerline axis 238 in the first rotational direction, but at a second rotational speed. Similarly, the gears 242 of the second gearbox 212 are configured to generate rotary movement of output shaft 246 and second disk 216 about longitudinal centerline axis 238 at the second rotational speed, but in a second rotational direction opposite to the first rotational direction. The first and second gearboxes 210, 212 may be configurable to have a speed ratio (i.e., the ratio of the input rotational speed to the output rotational speed) of 1:2, 1:3, or 1:4. Thus, each gearbox 210, 212 is configurable to increase the first rotational speed of input shaft 228 such that, during operation, the second rotational speed of their respective output shafts 244, 246 (and, hence, of the first and second disks 214, 216) is two, three, or four times greater than the first rotational speed, thereby enabling the high-order force simulator device 200 to simulate second, third, and fourth order tire non-uniformity forces. It should be noted that, generally, each gearbox 210, 212 is configured to produce rotary movement of its respective output shaft 244, 246 (and, hence, of the first and second disks 214, 216) at the same second rotational speed; however, if desired, the gearboxes 210, 212 may be configured to produce rotary movement of output shafts 244, 246 (and, hence, of the first and second disks 214, 216) such that the first output shaft 244 rotates at a different rotational speed than the second output shaft 246. In some embodiments, the output shafts 244, 246 may be cylindrically shaped and coaxially aligned around the input shaft 228 as depicted in FIG. 11.

The first and second disks 214, 216 are coupled to output shafts 244, 246 respectively and each include a first portion 248, 250 which extends radially outward from respective output shafts 244, 246 and has a first thickness, $t_1$. Each disk 214, 216 also includes a second portion 252, 254 extending radially outward from respective first portions 248, 250 to the peripheries of the disks 214, 216 and having first faces 256, 258 and opposed second faces 260, 262. The respective first faces 256, 258 and second faces 260, 262 are substantially parallel such that each respective second portion 252, 254 of a disk 214, 216 has a second thickness, $t_2$, greater than first thickness, $t_1$.

Each second portion 252, 254 defines therein the respective pluralities of radially-located weight retaining slots 218, 220, briefly described above, at various angular positions about longitudinal centerline axis 238 such that each weight retaining slot 218 of the first disk 214 has a similarly-located, corresponding weight retaining slot 220 of the second disk 216. The weight retaining slots 218, 220 may be capable of holding an imbalance weight 222, 224. In some embodiments, weight retaining slots 218, 220 may be T-slots such that imbalance weights 222, 224 may be secured during use with a T-bolt 295. With reference to FIG. 11 for example, an imbalance weight 224 may be secured to disk 216 via T-bolt 295 such that T-bolt 295 is inserted into weight retaining slot 220 and through imbalance weight 224. T-bolt 295 may be secured to disk 216 using a nut 296 or other similar securing device capable of securing a T-bolt 295 to disk 216. One or more T-bolts may used in accordance with the many embodiments of the present invention. Additionally, different weighted T-bolts may also be used and the weight of the T-bolts may also be considered when selecting imbalance weights 222, 224. Each radially-located weight retaining slot 218, 220 may extend into the respective second portion 252, 254 of a disk 214, 216 from a respective second face 260, 262 thereof such that the centerline 264, 266 of each slot 218, 220 is located at a radius, r, measured from longitudinal centerline axis 238.

The high-order force simulator device 200 further comprises a plurality of imbalance weights 222, 224 which are attached to and removable from the weight retaining slots 218, 220 and weight securing slots 268, 270 as needed for different test runs. Generally, prior to a test run, a first imbalance weight 222 and a second imbalance weight 224 are attached to respective weight retaining slots 218, 220 and corresponding weight securing slots 268, 270 that are located at a similar angular position about longitudinal centerline axis 238. Thus, the first and second imbalance weights are positioned to rotate relative to the vehicle wheel. Each imbalance weight 222, 224, typically, has a weight measuring approximately one-half ounce to approximately three ounces. Other weights may also be used in some embodiment of the present invention and the weight of a T-bolt and T-bolt securing device may be considered when selecting the weight of an imbalance weight. Once positioned each imbalance weight 222, 224 is eccentrically-located relative to longitudinal centerline axis 238 because each weight retaining slot 218, 220 and corresponding weight securing slot 268, 270 are offset by the radius, r, from the longitudinal centerline axis 238.

Referring back to FIG. 10, the wheel adapter 206 of the high-order force simulator device 200 is substantially similar to the wheel adapter 104 of the first order force simulator device 100. The wheel adapter 206 includes a collar portion 280 which defines a bore (not visible) therein which is configured to receive the first portion of input shaft 228 and to interact with the key slot 234 thereof to enable attachment of the collar portion 280 to the input shaft 228. When so attached, the collar portion 280 is coaxially positioned around the input shaft 228 and the longitudinal centerline axis 238 thereof. The wheel adapter 206 further includes a flange portion 282 extending from the collar portion 280 and having a plurality of holes 284 extending therethrough which are located and adapted to receive the studs extending from the vehicle wheel 202.

In use, the high-order force simulator device 200 is built for different gearboxes 210, 212 which are appropriate for the high-order tire non-uniformity forces (e.g., second, third, or fourth order) to be simulated during such test runs. The gears 240, 242 of the gearboxes 210, 212 are then configured to produce such speed ratios. Next, the weights of imbalance weights 222, 224 (and, hence, particular imbalance weights 222, 224) are selected based on the speed(s) at which the one or more test runs will be conducted, the selected speed ratios of the gearboxes 210, 212, and the amplitude(s) of the high-order tire non-uniformity forces that are to be simulated during the one or more test runs. The selected imbalance weights 222, 224 are subsequently attached to and secured within weight retaining slots 218, 220 and corresponding weight securing slots 268, 270 of disks 214, 216. Then, the flange portion 282 of the wheel adapter 206 is secured to the vehicle wheel 202 by locating the wheel adapter 206 adjacent to the vehicle wheel 202 with the wheel's studs protruding through the plurality of holes 284 and then screwing lug nuts on the studs tightly against the flange portion 282. The input shaft 228 of the high-order force simulator device 200 is then attached to the collar portion 280 of the wheel adapter 206 by inserting the first portion of the input shaft 228 into the collar portion 280 and securing the collar portion 280 to the first portion of the input shaft 280 using key slot 234. In such position, longitudinal centerline axis 238 of the housing 208 and longitudinal centerline axis 204 of the vehicle wheel 202 are substantially collinear.

As mentioned above, the high-order force simulator 200 may also comprise rotation restriction member 290. Rotation restriction member 290 may be similar to the rotation restriction member discussed with the first order force simulator 100. The rotation restriction member 290 generally includes a yoke 291 and a bar 293. The yoke 291 may extend at least partially around and in contact with the second gearbox 212 such that the yoke 291 clamps about the housing of the second gearbox 212. The bar 293 may have first and second ends 292, 294. The bar 293 connects to the yoke 290 at its first end 292 and extends from the yoke 291 in a, generally, vertical direction when the high order force simulator device 200 is attached to a vehicle wheel. The bar 293 may be secured near its second end 294 to a vehicle fender above the vehicle wheel during use, thereby preventing the yoke 291 and the housing of the second gearbox 212 from rotating about longitudinal centerline axis 238. In some embodiments, the bar 293 may be secured to other fixed objects capable of preventing the housing of the device 200 from rotating such as other vehicle parts, a weight system, or other type of tether.

During a test run, the wheel adapter 206 rotates with the vehicle wheel 202 to which it is attached and, by virtue of its attachment to input shaft 228, causes the input shaft 228 to rotate in the rotational direction of the vehicle wheel 202 (i.e., the first rotational direction) and at the rotational speed of the vehicle wheel 202 (i.e., the first rotational speed). As the vehicle wheel 202 is rotated (e.g., either by the vehicle being driven on a road or by an external device imparting rotation to the vehicle wheel 202), the first gearbox 210 is driven by input shaft 228 and transfers the rotary movement of input shaft 228 to output shaft 244 such that output shaft 244 is rotated in the first rotational direction (i.e., the same rotational direction as vehicle wheel 202) and at the second rotational speed determined by the configured speed ratio of the first gearbox 210. By virtue of the first disk 214 being attached to output shaft 244 and imbalance weight 222 being secured within weight retaining slot 218, imbalance weight 222 is rotated eccentrically about longitudinal centerline axis 238 at the offset radius, r, in the first rotational direction, but at the second rotational speed.

Similarly, the second gearbox 212 is driven by input shaft 228 with the second gearbox 212 transferring the rotary movement of input shaft 228 to output shaft 246 such that output shaft 246 is rotated in the second rotational direction (i.e., opposite to the rotational direction of vehicle wheel 202) and at the second rotational speed as determined by the configured speed ration of the second gearbox 212. Since the second disk 216 is attached to output shaft 246 and imbalance weight 224 is secured within weight retaining slot 220, imbalance weight 224 is rotated eccentrically about longitudinal centerline axis 238 at the offset radius, r, in the second rotational direction and at the second rotational speed.

It should be noted that, as with the first order force simulator device 100, to test a vehicle's sensitivity to different amplitudes of tire non-uniformity forces and/or to conduct different test runs on the same or different vehicles, the high-order force simulator device 200 may be configured with imbalance weights 222, 224 having weight measures other than those described herein or with first imbalance weight 222 and second imbalance weight 224 having the same or different weight measures relative to one another. Similarly, the high-order force simulator device 200 may also be configured with disks 214, 216 having different diameters and/or having weight retaining slots 218, 220 located at an offset distance relative to longitudinal centerline axis 238 which is different than that described herein, thereby causing the imbalance weights 222, 224 to be positioned at a different offset distance relative to longitudinal centerline axis 238 and, hence, more or less eccentric to longitudinal centerline axis 238. Further, the high-order force simulator device 200 may be configured to produce different tire non-uniformity force amplitudes for different test runs by utilizing different combinations of imbalance weights 222, 224 and different offset distances relative to longitudinal centerline axis 238. Still further, the high-order force simulator 200 may generate different tire non-uniformity force amplitudes for different test runs by configuring gearboxes 210, 212 to operate at different speed ratios such that disks 214, 216 and imbalance weights 222, 224 are rotated at different rotational speeds relative to the rotational speed of vehicle wheel 202.

Through rotation of imbalance weights 222, 224 in opposite rotational directions, the high-order force simulator device 200 generates a resultant excitation force on the rotational shaft of a vehicle wheel 202 comprising a first excitation force produced by rotation of the first imbalance weight 222 and a second excitation force produced by rotation of the second imbalance weight 224. Both excitation forces are transmitted to the rotational shaft of the vehicle wheel 202 via input shaft 228 and wheel adapter 206. The resultant excitation force, comprising the net of both excitation forces, is transmitted from the rotational shaft of the vehicle wheel 202 to the vehicle's steering wheel through the vehicle's steering linkage and seat through the vehicle and body suspension. The resultant excitation force may be varied in amplitude and direction while testing a vehicle's sensitivity to high-order tire non-uniformity forces during different test runs by using imbalance weights 222, 224 having different weight measures (i.e., different masses), by varying the offset distance of the weight retaining slots 218, 220 and, hence, imbalance weights 222, 224 (i.e., the eccentricity) from longitudinal centerline axis 238 of housing 208 and longitudinal centerline axis 204 of the vehicle wheel 202 (e.g., through the use of different disks 214, 216 ), by configuring the gearboxes 210, 212 to have different speed ratios, and by initiating test runs with the imbalance weights 222, 224 positioned in certain arrangements about longitudinal centerline axis 238 and longitudinal centerline axis 204 of vehicle wheel 202. As with the first order force simulator device 100, during a test run, a plurality of sensors (generally including one or more accelerometers) secured to the vehicle's steering wheel and seat track detect movements of the vehicle steering wheel and seat track which are representative of the vehicle's sensitivity to the tire non-uniformity force simulated by the resultant excitation force generated by the high-order force simulator device 200.

The first and second excitation forces correspond to respective centrifugal forces which are generated due to the rotation of the high-order force simulator device's imbalance weights 222, 224. The centrifugal force, $F_c$, generated by rotation of a particular imbalance weight 222, 224 is computed by:

$$F_c = mr(n\omega)^2 \tag{15}$$

where: "m" is the mass of the imbalance weight 222, 224; "r" is the radial distance between the centerline of weight retaining slots 218, 220 and longitudinal centerline axis 238; "n" is the speed ratio of the appropriate gearbox 210, 212; "nω" is the rotational speed of the imbalance weight 222, 224 about longitudinal centerline axis 238; "ω" is the rotational speed of the wheel; and n is the nth order of the wheel rotation speed (n=2, 3, 4 for high order simulator device 200).

The generated centrifugal force has, at any particular time during rotation of an imbalance weight 222, 224, a vertical component, $F_{cv}$, and a horizontal component, $F_{ch}$. The vertical component, $F_{cv}$, of the generated centrifugal force is computed by:

$$F_{cv} = mr(n\omega)^2 \sin(\theta) \tag{16}$$

where: "m", "r", "n", and "ω" represent the same parameters as described in the previous paragraph, and "θ" is the angle between (i) the instantaneous angular position of the imbalance weight 222, 224 about longitudinal centerline axis 238, and (ii) a horizontal x-axis 182 of a Cartesian coordinate system relative to which the imbalance weight 222, 224 was aligned (as described below) prior to the start of its rotation. Similarly, the horizontal component, $F_{ch}$, of the generated centrifugal force is computed by:

$$F_{ch} = mr(n\omega)^2 \cos(\theta) \tag{17}$$

where: "m", "r", "n", and "ω" represent the same parameters as described in the previous paragraph, and "θ" represents the same angle as described above with respect to the vertical component, $F_{cv}$, of the generated centrifugal force.

Each of the first and second excitation forces corresponds to a centrifugal force which is generated by the rotation of a particular imbalance weight 222, 224. Hence, each excitation force includes vertical and horizontal components equal to their corresponding centrifugal force counterparts. By summing the vertical components for the first excitation force generated by the first imbalance weight 222 and the second excitation force generated by the second imbalance weight 224, the vertical component of the resultant excitation force, $F_{ev}$, generated by the high-order force simulator device 200 at any given time is:

$$F_{ev} = m_1 r_1 (n_1 \omega_1)^2 \sin(\theta_1) + m_2 r_2 (n_2 \omega_2)^2 \sin(\theta_2) \tag{18}$$

where: "m", "r", "n", "ω", and "θ" represent the same parameters as described above, but with respect to the first and second weights imbalance weights 222, 224 as designated by the "1" and "2" subscripts. By summing the horizontal components for the first excitation force generated by the first imbalance weight 222 and the second excitation force generated by the second imbalance weight 224, the horizontal component of the resultant excitation force, $F_{eh}$, generated by the high-order force simulator device 200 at any given time is similarly given by:

$$F_{eh} = m_1 r_1 (n_1 \omega_1)^2 \cos(\theta_1) + m_2 r_2 (n_2 \omega_2)^2 \cos(\theta_2) \tag{19}$$

where: "m", "r", "n", "ω", and "θ" represent the same parameters as described above, but with respect to the first and second imbalance weights 222, 224 as designated by the "1" and "2" subscripts.

Similar to the first order force simulator 100, imbalance weights 222, 224 may rotate in opposite directions during operation of the high-order force simulator device 200. As a consequence, the direction of the resultant excitation force, $F_e$, produced by the first and second excitation forces is also established, or set, for a particular vehicle sensitivity test run by arranging the positions of the imbalance weights 222, 224 in a particular arrangement prior to the beginning of the test run. If, for a particular test run, it is desired to test a vehicle's sensitivity to tire non-uniformity forces acting only in a vertical direction, the disks 214, 216 and imbalance weights 222, 224 are arranged prior to the start of the test run in the initial arrangement, or positions, shown schematically in FIG. 3. In such arrangement, both imbalance weights 222, 224 are located along a vertical z-axis 180 passing through longitudinal centerline axis 238 and longitudinal centerline axis 204. When both imbalance weights 222, 224 rotate in opposite directions during the test run as illustrated schematically in FIG. 4 at an intermediate time between the start and end of the test run, the horizontal components for the first excitation force generated by the first imbalance weight 222 and the second excitation force generated by the second imbalance weight 224 either (i) equal zero (e.g., when both imbalance weights 222, 224 are aligned along vertical z-axis 180) or (ii) have the same magnitude, but act in opposite horizontal directions, thereby canceling each other such that their sum equals zero. This can be demonstrated from equation (19) for horizontal force:

Since $m_1 r_1 = m_2 r_2$ as arranged, and $(n_1 \omega_1)^2 = (n_2 \omega_2)^2$ as the gearbox 210, 212 being design, as well as $\theta_2 = 180 - \theta_1$, the equation (19) becomes:

$$\begin{aligned} F_{eh} &= m_1 r_1 (n_1 \omega_1)^2 \cos(\theta_1) + m_2 r_2 (n_2 \omega_2)^2 \cos(\theta_2) \\ &= m_1 r_1 (n_1 \omega_1)^2 \cos(\theta_1) + m_2 r_2 (n_2 \omega_2)^2 \cos(180 - \theta_1) \\ &= m_1 r_1 (n_1 \omega_1)^2 \cos(\theta_1) - m_2 r_2 (n_2 \omega_2)^2 \cos(\theta_1) \\ &= 0 \end{aligned} \tag{20}$$

As a consequence, the resultant excitation force, $F_e$, produced by the high-order force simulator device 200 at such intermediate time acts in a positive or negative vertical direction (e.g., depending on the particular angular position of the imbalance weights 222, 224 at such time—whether both are above or below a horizontal x-axis 182 passing through longitudinal centerline axis 238 and longitudinal centerline axis 204) and is equal to the sum of the vertical components for the first excitation force generated by the first imbalance weight 222 and the second excitation force generated by the second imbalance weight 224 at such time as described above. This can be demonstrated from equation (18) for vertical force:

Since $m_1 r_1 = m_2 r_2$ as arranged, and $(n_1 \omega_1)^2 = (n_2 \omega_2)^2$ as the gearbox 210, 212 being design, as well as $\theta_2 = 180 - \theta_1$, the equation (18) becomes:

$$\begin{aligned} F_{ev} &= m_1 r_1 (n_1 \omega_1)^2 \sin(\theta_1) + m_2 r_2 (n_2 \omega_2)^2 \sin(\theta_2) \\ &= m_1 r_1 (n_1 \omega_1)^2 \sin(\theta_1) + m_2 r_2 (n_2 \omega_2)^2 \sin(180 - \theta_1) \\ &= m_1 r_1 (n_1 \omega_1)^2 \sin(\theta_1) + m_2 r_2 (n_2 \omega_2)^2 \sin(\theta_1) \\ &= 2 m_1 r_1 (n_1 \omega_1)^2 \sin(\theta_1) \end{aligned} \tag{21}$$

If, for a different test run, it is desired to test a vehicle's sensitivity to tire non-uniformity forces acting in a horizontal (i.e., vehicle fore/aft) direction, the imbalance weights 222, 224 are oriented prior to the start of the test run in the initial arrangement, or positions, shown schematically in FIG. 5 with both imbalance weights 222, 224 being located along the horizontal x-axis 182. Then, with the two imbalance weights 222, 224 rotating in opposite directions during the test run as illustrated schematically in FIG. 6 at an intermediate time between the start and end of the test run, the vertical components for the first excitation force generated by the first imbalance weight 222 and the second excitation force generated by the second imbalance weight 224 either (i) equal zero (e.g., when both imbalance weights 222, 224 are aligned along horizontal x-axis 182) or (ii) have the same magnitude, but act in opposite vertical directions, thereby canceling each other such that their sum equals zero. This can be demonstrated from equation (18) for vertical force:

Since $m_1r_1=m_2r_2$ as arranged, and $(n_1\omega_1)^2=(n_2\omega_2)^2$ as the gearbox 210, 212 being design, as well as $\theta_2=-\theta_1$, the equation (18) becomes:

$$\begin{aligned}F_{ev} &= m_1r_1(n_1\omega_1)^2\sin(\theta_1) + m_2r_2(n_2\omega_2)^2\sin(\theta_2) \quad (22)\\ &= m_1r_1(n_1\omega_1)^2\sin(\theta_1) + m_2r_2(n_2\omega_2)^2\sin(-\theta_1)\\ &= m_1r_1(n_1\omega_1)^2\sin(\theta_1) - m_2r_2(n_2\omega_2)^2\sin(\theta_1)\\ &= 0\end{aligned}$$

As a consequence, the resultant excitation force, $F_e$, produced by the high-order force simulator device 200 at such intermediate time acts in a positive or negative horizontal direction (e.g., depending on the particular angular position of the imbalance weights 222, 224 at such time—whether both are left or right of the vertical z-axis 180) and is equal to the sum of the horizontal components for the first excitation force generated by the first imbalance weight 222 and the second excitation force generated by the second imbalance weight 224 at such time as described above. This can be demonstrated from equation (19) for horizontal force:

Since $m_1r_1=m_2r_2$ as arranged, and $(n_1\omega_1)^2=(n_2\omega_2)^2$ as the gearbox 210, 212 being design, as well as $\theta_2=-\theta_1$, the equation (19) becomes:

$$\begin{aligned}F_{eh} &= m_1r_1(n_1\omega_1)^2\cos(\theta_1) + m_2r_2(n_2\omega_2)^2\cos(\theta_2) \quad (23)\\ &= m_1r_1(n_1\omega_1)^2\cos(\theta_1) + m_2r_2(n_2\omega_2)^2\cos(-\theta_1)\\ &= m_1r_1(n_1\omega_1)^2\cos(\theta_1) + m_2r_2(n_2\omega_2)^2\cos(\theta_1)\\ &= 2m_1r_1(n_1\omega_1)^2\cos(\theta_1)\end{aligned}$$

The high-order force simulator device 200, similar to the first order force simulator device 100, is further operable (with slight modification) to simulate any combination of both vertical and horizontal tire non-uniformity forces simultaneously having a specified phase relationship therebetween. By equipping the high-order force simulator device 200 with pairs of imbalance weights 222A, 222B, 224A, 224B, the first pair of imbalance weights 222A, 222B simulates a vertical excitation force and the second pair of weights 224A, 224B simulates a horizontal excitation force with a phase delay relative to the vertical excitation force. The phase delay may be adjusted to a specified value by positioning the disks 214, 216 and the pairs of imbalance weights 222A, 222B, 224A, 224B at appropriate positions relative to one another prior to the start of a test run. Since the phase delay is adjustable, the phase delay may be adjusted between test runs based on the respective vehicle response phases to vertical and horizontal excitation forces, thereby enabling the worst vehicle response to be assessed with the high-order force simulator device 200.

Since the high-order force simulator device 200 is operable to generate excitation forces that simulate high-order excitation forces that simulate high-order tire non-uniformity forces having specific amplitudes and directions as desired by engineers, the high-order force simulator device 200 may also be used to assess a vehicle's sensitivity to a particular high-order tire non-uniformity force acting in a particular direction. Similar to the first order force simulator 100, a vehicle's shake sensitivity to a vertical high-order tire non-uniformity force (i.e., simulated by a vertical excitation force produced by the high-order force simulator device 200) is defined as:

$$S_{shake,v}=a_{shake}/F_v \quad (24)$$

A vehicle's shake sensitivity to a horizontal high-order tire non-uniformity force (i.e., simulated by a horizontal excitation force produced by the high-order force simulator device 200) is defined as:

$$S_{shake,h}=a_{shake}/F_h. \quad (25)$$

Figure 12:
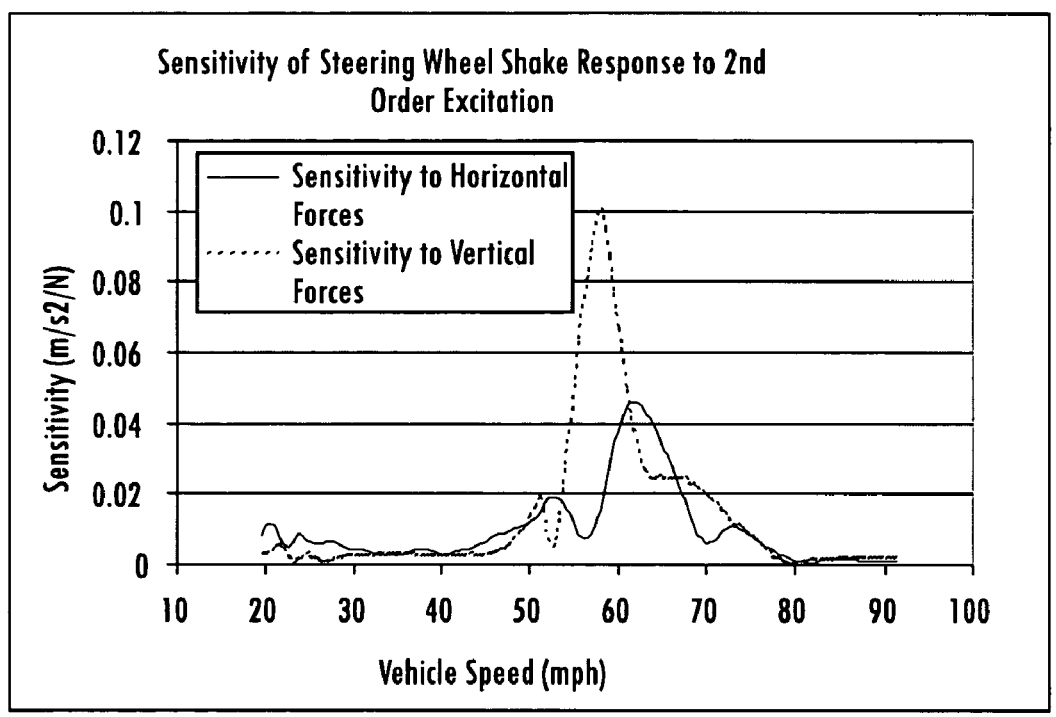
FIG. 12 displays an example of graphical relationships of vehicle steering wheel shake (lateral translation vibration) response sensitivity to vertical and horizontal second order tire non-uniformity forces simulated by the higher-order tire non-uniformity force simulator device of FIG. 10 during different test runs at different vehicle speeds.

Knowing a vehicle's sensitivity to vertical and horizontal (fore/aft) high-order tire non-uniformity forces, a vehicle manufacturer may set a vehicle level response target and cascade the vehicle level response target to vehicle sensitivity targets and high-order tire non-uniformity force targets. FIG. 12 displays an example of the graphical relationships of vehicle steering wheel shake response sensitivity to vertical and horizontal second order tire non-uniformity forces simulated by the high-order force simulator device 200 during different test runs at different vehicle speeds. In FIG. 12, the shake response sensitivity is associated with the vertical axis and is displayed in units of meters/square second/Newton, while the vehicle's speed is associated with the horizontal axis and is displayed in units of miles per hour. The solid line represents the vehicle's steering wheel shake sensitivity to horizontal (fore/aft) second order tire non-uniformity forces (i.e., to horizontal (fore/aft) second order excitation forces generated by the high-order force simulator device 200) as measured by accelerometers positioned about the vehicle's steering wheel during the test runs. The dashed line represents the vehicle's steering wheel shake sensitivity to vertical second order tire non-uniformity forces (i.e., to vertical second order excitation forces produced by the high-order force simulator device 200) as also measured by such accelerometers.

The various embodiments of the present invention provide devices and methods capable of simulating non-uniform tire forces caused by tire manufacturing tire processes. Some embodiments of the present invention may simulate first order and higher order force levels so that the effect of first order and higher order (2d, 3d, 4th, etc.) resultant forces may be monitored, measured, or calculated. Through utilization of the various embodiments of the present invention, vehicle manufactures can determine how different tires non-uniformity forces effect automobile driving characteristics.

The various embodiments of the present invention have been described with reference to the above discussed embodiments, but the present invention should not be construed to cover only these embodiments. Rather, these embodiments are only exemplary embodiments. Variations of the above exemplary embodiments may suggest themselves to those skilled in the art or others without departing from the spirit and scope of the present invention. The appended claims and their full range of equivalents should, therefore, only define the full scope of the present invention's many embodiments.

We claim:

1. A device to simulate first order tire non-uniformity forces comprising:
   a gearbox comprising an input shaft to receive rotational energy from a vehicle wheel and a plurality of gears to transfer the rotational energy to an output shaft;
   a wheel adapter to attach to a vehicle wheel, rotate in a first rotational direction, and to couple to the input shaft;
   a weight retaining member adapted to couple to the output shaft, wherein the gearbox is adapted to rotate the weight retaining member in a second rotational direction; and
   a rotation restriction member to attach to the gearbox to restrict the gearbox from rotating.

2. The device of claim 1 further comprising a first weight coupled to the weight retaining member and a second weight adapted to couple to a vehicle wheel, wherein the first weight and second weight rotate in opposite directions.

3. The device of claim 1 wherein the input shaft and output shaft are cylindrically shaped and the output shaft is coaxially aligned around the input shaft.

4. The device of claim 1 wherein the gearbox is adapted to rotate the weight retaining member at approximately the same rotational velocity as a vehicle wheel.

5. The device of claim 1 further comprising a disk coupled to the output shaft, the disk comprising a periphery and a plurality of spaced apart slots around the periphery, wherein the weight retaining member is adapted to be secured to the slots such that rotational energy is transferred from the output shaft to the weight retaining member.

6. The device of claim 1 wherein the weight retaining member comprises an elongated bar having a predetermined length and two ends, and defining a hole at each of the ends.

7. The device of claim 6 wherein the holes at each end of the bar have a center and the distance between the hole centers is approximately equal to one-half of the diameter of a vehicle wheel.

8. The device of claim 6 wherein at least one of the holes is adapted to hold a weight weighing approximately one-half ounce to approximately three ounces.

9. The device of claim 1 wherein the second weight weighs approximately one to approximately four ounces.

10. The device of claim 1 wherein the rotation restriction member comprises a yoke coupled to a bar, wherein the yoke is adapted to attach to the gearbox and the bar is adapted to attach to a fixed object to restrict the gearbox from rotating.

11. The device of claim 1 wherein the first rotational direction is opposite the second rotational direction.

12. A device to simulate high order tire non-uniformity forces comprising:
   a wheel adapter to receive an input rotational direction and an input rotational velocity from a vehicle wheel;
   a housing comprising an input shaft, first and second gearboxes, and first and second disks, wherein the first gearbox is adapted to rotate the first disk in the first rotational direction at a first rotational speed, the second gearbox is adapted to rotate the second disk in a second rotational direction at a second rotational speed, and wherein the input shaft is adapted to couple to the wheel adapter; and
   a rotation restriction member adapted to attach to the housing to restrict the gearboxes from rotating.

13. The device of claim 12 wherein the input shaft is adapted to couple the wheel adapter to the gearboxes such that the input rotational speed and rotational direction are provided to the two gearboxes.

14. The device of claim 12 further comprising a first cylindrically shaped output shaft and a second cylindrically shaped output shaft coaxially aligned around the input shaft.

15. The device of claim 12, wherein the housing further comprises a first output shaft to couple the first gearbox to the first disk.

16. The device of claim 12, wherein the housing further comprises a second output shaft to couple the second gearbox to the second disk.

17. The device of claim 12 wherein the two disks comprise a plurality of weight retaining slots to hold at least one weight.

18. The device of claim 12 wherein the gearboxes are configured to rotate the disks at different rotational speeds.

19. The device of claim 12 wherein the gearboxes are configured to rotate the disks at speeds higher than the input rotational speed.

20. The device of claim 12, wherein the first rotational direction is opposite to the second rotational direction.

21. The device of claim 12, wherein the first and second rotational speeds are approximately the same.

22. The device of claim 12, wherein the first and second weight approximately one-half ounce to three ounces.

23. A method of simulating first order tire non-uniformity forces comprising:
   positioning a first and second weight to rotate relative to a vehicle wheel;
   rotating the first weight in a first rotational direction at a first rotational speed and rotating the second weight in a second rotational direction at a second rotational speed;
   determining a resultant excitation force caused by the rotating weights; and
   determining at least one of steering wheel movements and seat track movements caused by the resultant excitation force.

24. The method of claim 23 further comprising calculating a first excitation force in response to the rotation of the first weight and a second excitation force in response to the rotation of the second weight.

25. The method of claim 24 further comprising calculating the resultant excitation force based on the first and second excitation forces.

26. The method of claim 23 further comprising coupling the first weight to the vehicle wheel.

27. The method of claim 23 further comprising coupling the second weight to a weight retaining member, wherein the weight retaining member is adapted to rotate the second weight relative to a vehicle wheel.

28. The method of claim 23 further comprising coupling a gearbox to a vehicle wheel, wherein the gearbox comprises an input shaft and an output shaft, and is adapted to transfer the rotational energy of a vehicle wheel from the input shaft to the output shaft.

29. The method of claim 23 further comprising rotating one of the weights in the same direction as the wheel rotational direction and rotating the other weight in a direction opposite to the wheel rotational direction.

30. The method of claim 23 further comprising varying the position of the weights to vary the resultant excitation force caused by the rotating weights.

31. The method of claim 23 further comprising varying the masses of the weights to vary the resultant excitation force caused by the rotating weights.

32. The method of claim 23 further comprising coupling a gearbox to a vehicle wheel, wherein the gearbox is adapted to rotate the second weight in the second rotational direction at the second rotational speed.

33. A method of simulating high order tire non-uniformity forces comprising:
- positioning a first and a second weight to rotate relative to a vehicle wheel, wherein a vehicle wheel is adapted to rotate in a wheel rotational direction at a wheel rotational speed;
- rotating the first weight in a first rotational direction at a first rotational speed;
- rotating the second weight in a second rotational direction at a second rotational speed;
- determining a resultant excitation force caused by the rotating weights; and
- determining at least one of steering wheel movements and seat track movements caused by the resultant excitation force.

34. The method of claim 33 further comprising calculating a first excitation force in response to the rotation of the first weight and a second excitation force in response to the rotation of the second weight.

35. The method of claim 34 further comprising calculating the resultant excitation force based on the first and second excitation forces.

36. The method of claim 33 further comprising coupling the first weight to a disk, wherein the disk is adapted to rotate relative to a vehicle wheel.

37. The method of claim 33 further comprising coupling the second weight to a disk, wherein the disk is adapted to rotate relative to a vehicle wheel.

38. The method of claim 33 further comprising rotating the first and second weights faster than a vehicle wheel rotational speed.

39. The method of claim 33 further comprising rotating the first weight and second weight at different speeds.

40. The method of claim 33 further comprising rotating the first weight in a wheel rotational direction.

41. The method of claim 33 further comprising rotating the second weight in a rotational direction different from the wheel rotational direction.

42. The method of claim 33 further comprising rotating the first weight and second weight in different rotational directions.

43. The method of claim 33 further comprising varying the position of the first and second weights.

44. The method of claim 33 further comprising varying the masses of the first and second weights.

45. The method of claim 33 further comprising coupling two gearboxes to a vehicle wheel, wherein the gearboxes are adapted to rotate the first weight and the second weight in opposite rotational directions and rotate the first weight and the second weight at the same rotational speed.

* * * * *